United States Patent
Morikawa et al.

(10) Patent No.: US 6,841,582 B2
(45) Date of Patent: Jan. 11, 2005

(54) THERMOPLASTIC ELASTOMER COMPOSITION, FOAM MADE FROM THE SAME, AND PROCESS FOR PRODUCING FOAM

(75) Inventors: Akihiko Morikawa, Tokyo (JP); Kentarou Kanae, Tokyo (JP); Hideo Nakanishi, Tokyo (JP); Minoru Maeda, Tokyo (JP)

(73) Assignee: JSR Corporation, Tokyo (JP)

( * ) Notice: Subject to any disclaimer, the term of this patent is extended or adjusted under 35 U.S.C. 154(b) by 168 days.

(21) Appl. No.: 09/926,426

(22) PCT Filed: Mar. 1, 2001

(86) PCT No.: PCT/JP01/01566

§ 371 (c)(1),
(2), (4) Date: Jan. 14, 2002

(87) PCT Pub. No.: WO01/64784

PCT Pub. Date: Sep. 7, 2001

(65) Prior Publication Data

US 2002/0177659 A1 Nov. 28, 2002

(30) Foreign Application Priority Data

Mar. 1, 2000 (JP) .......................................... 2000-56554

(51) Int. Cl.⁷ ............................... C08L 9/00; C08J 9/00
(52) U.S. Cl. ............................ 521/82; 521/94; 521/95; 521/134; 521/139; 521/140
(58) Field of Search ............................. 521/82, 94, 95, 521/134, 139, 140; 525/98, 99

(56) References Cited

U.S. PATENT DOCUMENTS

| | | | | |
|---|---|---|---|---|
| 4,366,464 A | * | 12/1982 | Miyamoto et al. | 338/214 |
| 5,216,074 A | | 6/1993 | Imai et al. | |
| 5,543,438 A | * | 8/1996 | Shibayama et al. | 521/140 |
| 5,596,042 A | | 1/1997 | Itoh et al. | |

FOREIGN PATENT DOCUMENTS

| | | |
|---|---|---|
| EP | 0 040 934 | 12/1981 |
| EP | 0 503 220 | 9/1992 |
| EP | 0 875 526 | 11/1998 |
| JP | 2-43771 | 10/1990 |
| JP | 06-073222 | 3/1994 |
| JP | 8-27330 | 1/1996 |
| JP | 08027330 | * 1/1996 |
| JP | 8-319451 | 12/1996 |
| JP | 2000-44711 | 2/2000 |

OTHER PUBLICATIONS

Mizuno et al., electronic translation of JP 08027330, Jan. 1996.*

Mizuno et al., CAPLUS AN 1996:226111, Abstracting JP 08027330, Jan. 1996.*

Y. Mizuno, et al., Database Online! Chemical Abstracts Service, pp. 1–3, AN 128:62679, XP–002230538, "Flexible Olefin–Based Thermoplastic Elastomer Compositions", Nov. 25, 1997.

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

The present invention relates to a thermoplastic elastomer composition having a three-dimensional network structure which is not formed by a chemical crosslinking and having an excellent elasticity recovery and flexibility, a foam having a highly closed cell, an uniform cell shape, an excellent elasticity recovery, flexibility and appearance, and a process for producing the same. A thermoplastic elastomer of the invention is obtained by mixing in a predetermined ratio an EPDM (1), a crystalline polyethylenic resin (2) and a block copolymer (3) having a crystalline ethylenic polymeric block and a block which is more compatible with said EPDM than with said crystalline polyethylenic resin together with an anti-aging agent followed by kneading in a pressurized kneader. A foam of the invention is obtained by adding 1 part by mass of a wetting agent to 100 parts by mass of the thermoplastic elastomer composition described above together with a foaming agent, agitating and then performing an extrusion foaming.

13 Claims, 3 Drawing Sheets

US 6,841,582 B2

THERMOPLASTIC ELASTOMER COMPOSITION, FOAM MADE FROM THE SAME, AND PROCESS FOR PRODUCING FOAM

TECHNICAL FIELD

The present invention relates to a thermoplastic elastomer composition, a foam made from the same and a process for producing a foam. More particularly, the invention relates to a thermoplastic elastomer composition having a three-dimensional network structure which is not formed by a chemical crosslinking and having an excellent elasticity recovery and flexibility. Furthermore, the invention relates to a foam which is formed from the thermoplastic elastomer composition described above and in which the cells are formed uniformly and which has a highly closed cell, an uniform cell shape and size, an excellent elasticity recovery, flexibility and appearance and a method for producing such a foam. A thermoplastic elastomer composition of the invention can favorably be utilized in automobile interior parts, automobile exterior parts, light electric appliance parts, other industrial parts, building materials, sport goods and the like. A foam of the invention can favorably be utilized in automobile weather strip, vibration absorbers for electric appliances and the like.

BACKGROUND ART

Recently, a molded foam is demanded widely as an automobile weather strip and a buffering material against a vibration or a noise generated from a domestic electric appliance or an information device. One desired particularly is a thermoplastic elastomer composition capable of being molded conveniently into a foam. Such thermoplastic elastomer may for example be a dynamically crosslinked thermoplastic elastomer. Such elastomer (disclosed for example in Publication of Unexamined Patent Application No. Hei 6-73222) provides a foam which is more flexible when compared with those of a prior art.

But, a crosslinked rubber component contained in such elastomer can not uniformly be foamed. Namely, an uniform foaming is effected only in a part of a crystalline polyolefin, with the result that the crosslinked rubber component forms a rough cell structure. In addition, a gas escapes from the surface of a foam, resulting in a difficulty in maintaining the outer surface smooth, which leads to a poor appearance. Moreover, such elastomer can not prevent an odor or a discoloration sufficiently, and involves many problems to be solved such as a complicated manufacturing process, a high price of an applicable crosslinking agent and a limited utility due to the contamination resulting from a crosslinking agent and the like employed. On the other hand, an olefinic non-crosslinked thermoplastic elastomer can be foamed uniformly by melting, but a resultant foam involves a problematically high compression set due to an absence of the crosslinking.

The present invention solves the problems described above and is intended to provide a thermoplastic elastomer which can be foamed uniformly throughout the entire composition and which has a low compression set. In addition, the present invention is also intended to provide a foam which is obtained from a thermoplastic elastomer composition described above and which has a low compression set, a highly closed cell, a uniform cell shape, no risk of a contamination with a crosslinking agent due to no use of such crosslinking agent, a high flexibility and an excellent appearance and a process for producing such foam.

DISCLOSURE OF INVENTION

The present invention is based on the findings that a crystalline polyethylenic resin can be in a three-dimensional network structure which is not formed by a chemical crosslinking in an ethylene-α-olefinic copolymer, that such three-dimensional network structure enables an elasticity recovery comparable with that of a chemically-crosslinked thermoplastic elastomer and that upon melting the three-dimensional network structure of the crystalline polyethylenic resin undergoes a complete melting.

A thermoplastic elastomer composition of the invention comprises an ethylene-α-olefinic copolymer (1) and a crystalline polyethylenic resin (2), wherein the crystalline polyethylenic resin (2) is in a three-dimensional network structure in a matrix comprising the ethylene-α-olefinic copolymer (1).

The "ethylene-α-olefinic copolymer (1)"(hereinafter referred to as "EAO-based copolymer (1)") means a copolymer whose main components are ethylene and α-olefin except for ethylene. When the total amount of ethylene and α-olefin contained in such EAO-based copolymer is 100% by mole, the ethylene content is preferably 50 to 90% by mole. The ethylene content exceeding 90% by mole leads to a poor flexibility, while that less than 50% by mole leads to a problematically reduced mechanical strength.

Such EAO-based copolymer (1) may for example be an ethylene-propylene copolymer, an elastic copolymer whose main component is an olefin, including ethylene-propylene-non-conjugated diene terpolymer, ethylene-butene-1 copolymer, ethylene-butene-1-non-conjugated diene terpolymer, ethylene-octene copolymer, ethylene-octene-non-conjugated diene terpolymer and the like. Two or more of these polymers may be employed in combination. A non-conjugated diene as a constituent of the EAO-based copolymer (1) may preferably be ethylidene norbornene, dicyclopentadiene and 1,4-hexadiene. Such non-conjugated diene is present preferably in such an amount that gives an iodine value of the EAO-based copolymer not more than 40.

The Mooney viscosity of the EAO-based copolymer (1) is preferably 10 to 500 ML1+4 (100° C.) (hereinafter a Mooney viscosity is one measured at 100° C. using an L-shaped rotor with a preliminary heating for 1 minutes and a rotor operating for 4 minutes), more preferably 30 to 400. A Mooney viscosity less than 10 leads to reduced mechanical strength and elasticity recovery, while one exceeding 500 leads to a problematic reduction in the dispersibility of a crystalline polyethylenic resin (2).

The "crystalline polyethylenic resin (2)" described above contains ethylene as a main component, which is present in an amount of 90 to 100% by mole. Also, 10% by mass or more (preferably 20% by mass or more, usually 95% by mass or less) of such crystalline polyethylenic resin (2) is preferably insoluble when the resin is dissolved in a boiling n-hexane. The insoluble less than 10% by mass leads to a poor mechanical strength and a poor moldability of a resultant thermoplastic elastomer composition. The melting peak of the crystal measured by DSC is preferably 100° C. or higher.

Such crystalline polyethylenic resin (2) may for example be polyethylene, a copolymer with an α-olefin having 3 to 6 carbon atoms such as propylene, butene-1,4-methyl-pentene-1, hexane-1 and octene-1 having an ethylene content of 90% by mole or more. Among these polymers, a polyethylene may be any resin obtained by a high pressure process or a low pressure process. Two or more of these polymers may be used in combination.

A thermoplastic elastomer composition of the invention comprises as main components an ethylene-α-olefinic copolymer (1), a crystalline polyethylenic resin (2) and a block copolymer (3) described below, wherein the crystalline polyethylenic resin (2) and the block copolymer (3) are in a three-dimensional network structure in a matrix comprising the ethylene-α-olefinic copolymer (1).

The "ethylene-α-olefinic copolymer (1)" and the "crystalline polyethylenic resin (2)" are those described above. The "block copolymer (3)" described above is capable of binding the EAO-based copolymer (1) to the crystalline polyethylenic resin (2), the crystalline polyethylenic resin (2) and the block copolymer (3) are considered to be capable of forming a three-dimensional network structure in the EAO-based copolymer (1).

A crystalline polymeric block possessed by the block copolymer (3) may for example be a copolymer block whose ethylene unit content is 50% or more or a polymer block comprising an ethylene homopolymer. The block copolymer (3) preferably has crystalline polymeric blocks at its both ends. By having such crystalline polymeric blocks at the both ends, a particularly uniform three-dimensional network structure can be established. Such three-dimensional network structure formed in the EAO-based polymer consists usually of the crystalline polyethylenic resin (2) and the block copolymer (3) as main components. Thus, each of the crystalline polyethylenic resin (2) and the block copolymer (3) is a constituent of the three-dimensional network structure.

Furthermore, this block copolymer (3) is obtained by hydrogenating a block copolymer whose blocks at its both ends are those represented by A (a butadiene polymeric block having a 1,2-vinyl group content lower than that in B) and whose intermediate block is that represented by B (a conjugated diene polymeric block and/or a vinyl aromatic compound-conjugated diene random copolymeric block having a 1,2-vinyl group content higher than that in A), and wherein A is present in an amount of 5 to 90% by mass (more preferably 10 to 80% by mass) based on 100% by mass as the total of A and B, and wherein the 1,2-vinyl group content in A is less than 25% by mole and the 1,2-vinyl group content in B is not less than 25% by mole, and wherein at least 80% of the all double bonds contained in the block copolymer (3) before the hydrogenation is saturated and the number average molecular weight is 50,000 to 700,000.

The "block copolymer (3)" described above is a block copolymer obtained by hydrogenating a copolymer having As at its both ends (hereinafter referred to as "block As") and B between two block As (hereinafter referred to as "block B"). Thus, each of blocks A and B is a block before the hydrogenation.

With regard to the each block content based on 100% by mass as the total of block A and block B in the block copolymer (3), block A is present preferably in an amount of 5 to 90% by mass (more preferably 10 to 80% by mass). A block A content less than 5% by mass (a block B content exceeding 95% by mass) leads to a difficulty in exhibiting a sufficient crystallinity relative to an EAO-based copolymer (1) serving as a matrix, resulting in a difficulty in forming a three-dimensional network structure. A content exceeding 90% by mass (a block B content less than 10% by mass) results in a problematically increased hardness.

The "A" described above is a 1,3-butadiene polymeric block whose main component (90% by mass or more, preferably 95% by mass or more of the entire block A) is butadiene. The 1,2-vinyl group content in block A is preferably less than 25% by mole (more preferably 20% by mole or less, most preferably 15% by mole or less). A 1,2-vinyl group content in block A not less than 25% by mole leads to a marked reduction in the melting point of the crystal after a hydrogenation, resulting in a reduced mechanical strength. The number average molecular weight of this block A is 25,000 to 630,000 (more preferably 100,000 to 480,000). In the block copolymer (3), block A is hydrogenated, and show a structure analogous to a low density polymethylene.

The "B" described above is a conjugated diene polymeric block whose main component (50% by mass or more, preferably 60% by mass or more of the entire block B) is a conjugated diene compound. Such conjugated diene compound may for example be 1,3-butadiene, isoprene,2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene and the like. Among these listed above, 1,3-butadiene, isoprene and 1,3-pentadiene are preferred, with 1,3-butadiene being particularly preferred. Two or more of these compounds may be employed in block B. The 1,2-vinyl group content in block B is preferably 25% by mole or more (preferably 25 to 95% by mole, more preferably 25 to 90% by mole, particularly 25 to 85% by mole, especially 25 to 75% by mole, and most preferably 25 to 55% by mole). A content less than 25% by mole leads to a resin-like state which readily undergoes a reduction in the flexibility. In addition, the 1,2-vinyl group content in block B exceeds the 1,2-vinyl group content in block A. A 1,2-vinyl group content less than that in block A leads to a reduced flexibility of a thermoplastic elastomer composition of the invention. The number average molecular weight of this block B is preferably 5,000 to 665,000 (more preferably 20,000 to 540,000).

When the block B contains a vinyl aromatic polymeric block, the vinyl aromatic polymeric block content, based on 100% by mass as the entire block B, is not more than 35% by mass (more preferably not more than 30% by mass, more preferably not more than 25% by mass). By allowing a vinyl aromatic polymeric block to be present, the glass-transition temperature is increased and the low temperature profile and the flexibility are easy to be reduced, This block B becomes, after a hydrogenation, a polymeric block having a structure analogous to that of a rubbery ethylene-buthene-1 copolymeric block or a vinyl aromatic compound-ethylene-butene-1 copolymer.

The double bond contained in the block copolymer (3) obtained after a hydrogenation is saturated preferably at 80% or more (more preferably 90%, particularly 95 to 100%) of the entire double bonds before the hydrogenation. A saturation less than 80% leads to a reduction in the thermostability and the durability.

The number average molecular weight of the block copolymer (3) is 50,000 to 700,000 (more preferably 100,000 to 600,000). The molecular weight less than 50,000 leads to a reduction in the heat resistance, the strength, the fluidity and the processability, while one exceeding 700,000 leads to a reduction in the fluidity, the processability and the flexibility. The block copolymer (3) employed in the invention can be obtained for example by a method disclosed in Publication of Unexamined Patent Application No. Hei 3-1289576.

The block copolymer (3) of the invention may be a plural of block copolymers (3) which are linked via coupling agent residues. Thus, a structure [A-B-A-X]n-(A-B-A) [wherein n is an integer of 2 to 4, and X is a coupling agent residue] may be acceptable. Furthermore, [A-B-X]n-(B-A) [wherein n is an integer of 2 to 4, and X is a coupling agent residue] may also be acceptable, as long as the molecular weight of the coupling agent residue is smaller sufficiently relative to blocks A and B and does not affect the crystallinity of the block copolymer (3). Thus, when abbreviating a relatively smaller coupling agent residue, [A-B]n-A may be acceptable. A coupling agent may for example be diethyl adipate, divinylbenzene, tetrachlorosilicon, butyltrichlorosilicon, tetrachlorotin, butyltrichlorotin, dimethylchlorosilicon, tetrachlorogermanium, 1,2-dibromoethane, 1,4-chloromethylbenzene, bis(trichlorosilyl)ethane, epoxylated linseed oil., tolylene diisocyanate, 1,2,4-benzenetriisocyanate and the like.

The block copolymer (3) of the invention may be a modified hydrogenated block polymer which has been modified with a functional group. Such functional group may for example be at least one selected from the group consisting of carboxyl group, acid anhydride group, hydroxyl group, epoxy group, halogen atoms, amino group, isocyanate group, sulfonyl group and sulfonate group. A method for such modification may be any method known per se. The functional group content in this modified hydrogenated block polymer, based on 100% by mole as the entire constituent units of the hydrogenated block polymer, is preferably 0.01 to 10% by mole (more preferably 0.1 to 8% by mole, particularly 0.15to5% by mole). A preferable monomer which can be employed for introducing a functional group may for example be acrylic acid, methacrylic acid, itaconic acid, maleic acid, maleic anhydride, glycidyl acrylate, glycidyl methacrylate, allylglycidyl ether, hydroxyethyl methacrylate, hydroxypropyl methacrylate, hydroxyethyl acrylate, hydroxypropyl acrylate, dimethylaminoethyl methacrylate and the like.

The amounts of the EAO-based copolymer (1), the crystalline polyethylenic resin (2) and the block copolymer (3) to be contained in the invention may be: the EAO-based copolymer is present in an amount of 10 to 94% by mass (more preferably 20 to 94% by mass, particularly 25 to 94% by mass, especially 40 to 90% by mass and most preferably 50 to 94% by mass), the crystalline polyethylenic resin (2) is present in an amount of 5 to 80% by mass (more preferably 5 to 50% by mass, particularly 5 to 30% by mass) and the block copolymer (3) is present in an amount of 1 to 80% by mass (more preferably 2 to 50% by mass, particularly 3 to 30% by mass) based on 100% by mass as the total of these three components The EAO-based copolymer (1) content less than 10% by mass leads to a difficulty in obtaining a thermoplastic elastomer composition having a sufficient elasticity recovery, while one exceeding 94% by mass leads to a difficulty in obtaining a thermoplastic elastomer having a sufficient moldability. The crystalline polyethylenic resin (2) content less than 5% by mass leads to a difficulty in obtaining a thermoplastic elastomer composition having a sufficient elasticity recovery, while one exceeding 80% by mass leads to a difficulty in obtaining a thermoplastic elastomer having a sufficient elasticity. The block copolymer (3) content less than 1% by mass lead to a difficulty in obtaining a thermoplastic elastomer composition having a sufficient elasticity recovery, while one exceeding 80% by mass leads to a difficulty in obtaining a thermoplastic elastomer having a sufficient moldability.

A three-dimensional network structure can stably be obtained especially in a case that, based on 100% by mass as the total of above these three components, the EAO-based copolymer (1) is present in an amount of 40 to 94% by mass (more preferably 50 to 94% by mass) and the total of the crystalline polyethylenic resin (2) and the block copolymer (3) amounts to 6 to 60% by mass (more preferably 6 to 50% by mass) at the same time that, based on 100% by mass as the total of the crystalline polyethylenic resin (2) and the block copolymer (3), the crystalline polyethylenic resin (2) is present in an amount of 20 to 80% by mass (more preferably 30 to 70% by mass).

A thermoplastic elastomer composition of the invention may contain a crystalline α-olefinic polymer. In such case, the surface of the thermoplastic elastomer composition obtained can be imparted with a further smoothness. Such crystalline α-olefinic polymer is preferably one whose main component is an α-olefin having 3 or more carbon atoms, such as polypropylene, polybutene-1, poly 4-methyl-pentene-1, polyhexene-1, propylene-ethylene copolymer, propylene-butene-1 copolymer and the like. Two or more polymers listed above may be employed in combination. The amount of a crystalline α-olefinic copolymer to be added is 10% by mass or less, more preferably less than 5% by mass (particularly 4% by mass or less) based on 100% as the total of the EAO-based copolymer, the crystalline polyethylenic resin (2), the block copolymer (3) and the crystalline α-olefinic copolymer. An amount not more than 10% by mass serves to allow a three-dimensional network structure to be obtained very stably and to provides a composition having an especially low compression set.

A mineral oil-based softening agent can be added in an amount of 200 parts by mass or less (more preferably 100 parts by mass or less, particularly 50 parts by mass or less) based on 100 parts by mass as the total of the ethylene-α-olefinic copolymer (1), the crystalline polyethylenic resin (2) and the block copolymer (3). The mineral oil-based softening agent may for example be a naphthene-based or paraffin-based mineral oil and the like. The processability and the flexibility can be enhanced by adding such mineral oil-based softening agent. The method for adding such oil and the process for such addition are not limited particularly.

A method for producing a thermoplastic elastomer composition according to the invention is not particularly limited as long as the EAO-based copolymer (1) and the crystalline polyethylenic resin (2) can satisfactorily be dispersed. For example, a closed type kneader (roll mill, banbury mixer, pressurized kneader and the like), a single-screw extruder, a twin-screw extruder and a continuous kneader may be employed to heat a polymer to an appropriate temperature and then the kneading is continued under an appropriated shear stress to mix until a sufficient uniformity is obtained. The kneading temperature is preferably a temperature at which at least the block copolymer (3) is melted, usually within the range from 120 to 280° C. The kneading time is preferably 10 seconds to 60 minutes, although it varies depending on the type of the kneading machine.

The thermoplastic elastomer composition may contain additives, if necessary for a certain purpose, each in an amount by which the mechanical strength, the flexibility and the moldability are not affected adversely, such as antioxidant, antistatic agent, weatherability-imparting agent, UV absorber, glidant, anti-blocking agent, seal performance promoter, crystal seeding agent, flame retardant, antibacterial agent, antifungal agent, tackifier, softener, plasticizer, filler such as titanium oxide, carbon black, dry silica, wet silica, glass fiber, carbon fiber, metal fiber, aramid fiber, glass bead, asbestos, mica, calcium carbonate, potassium titanate whisker, talc, barium sulfate, glass flake, fluoro-resin and the like, rubber polymer such as isobutylene-isoprene copolymer and the like and thermoplastic resin and the like.

A foam of the invention is a foam whose main component is a thermoplastic elastomer composition comprising an ethylene-α-olefinic copolymer (1) and a crystalline polyethylenic resin (2), wherein the crystalline polyethylenic resin (2) is in a three-dimensional network structure in a matrix comprising the ethylene-α-olefinic copolymer (1). A foam of the invention is also a foam whose main component is a thermoplastic elastomer composition comprising as main components an ethylene-α-olefinic copolymer (1), a crystalline polyethylenic resin (2) and a block copolymer (3) of the invention, wherein said crystalline polyethylenic resin (2) and said block copolymer (3) of the invention are in a three-dimensional network structure in a matrix comprising the ethylene-α-olefinic copolymer (1). A foam of the invention as described above has a three-dimensional network structure which is not formed by a chemical crosslinking and also has an excellent elasticity recovery and flexibility, undergoes an uniform forming, a highly closed cell, an uniform cell shape and size and an excellent appearance.

A method for producing a foam of the invention comprises incorporating 0.01 to 20 parts by mass of a foaming agent to 100 parts by weight of a thermoplastic elastomer composition comprising an ethylene-α-olefinic copolymer (1) and a crystalline polyethylenic resin (2), wherein the crystalline polyethylenic resin (2) is in a three-dimensional network structure in a matrix comprising the ethylene-α-olefinic copolymer (1) followed by foaming. A method for producing a foam of the invention also comprises incorporating 0.01 to 20 parts by mass of a foaming agent to 100 parts by weight of a thermoplastic elastomer composition comprising as main components an ethylene-α-olefinic copolymer (1), a crystalline polyethylenic resin (2) and a block copolymer (3) of the invention, wherein the crystalline polyethylenic resin (2) and the block copolymer (3) of the invention are in a three-dimensional network structure in a matrix comprising the ethylene-α-olefinic copolymer (1) followed by foaming.

A "foaming agent" described above may for example be a heat degradable foaming agent, a volatile foaming agent and a hollow particle foaming agent and the like. The foaming agent can appropriately be selected on the basis of the production method. Any of these foaming agent may be employed alone or in combination with each other.

A heat degradable foaming agent may for example be a nitroso-based foaming agent such as N,N'-dinitrosopentamethylene tetramine and N,N'-dimethyl-N,N'-dinitrosoterephthalamide; an azo-based forming agent of barium azodicarboxylate such as azodicarbonamide and barium azodicarboxylate; a sulfohydrazide-based foaming agent such as p,p-oxybisbenzenesulfonyl hydrazide, 4,4'-oxybis(benzenesulfonyl hydrazide) and p-toluenesulfonyl semicarbazide; a triazine-based foaming agent such as trihydrazinotriazine; a tetrazole-based foaming agent such as 5-phenyltetrazole, azobistetrazole diguanidine and azobistetrazol aminoguanidine; an inorganic foaming agent such as sodium hydrogen carbonate. Two or more of these foaming agents may be employed in combination. The amount of such heat degradable foaming agent is preferably 0.1 to 100 parts by mass per 100 parts by mass of a thermoplastic elastomer composition, although it can be selected appropriately depending on the types of the foaming agent and the intended expansion ratio.

A volatile foaming agent may for example be an aliphatic hydrocarbon such as propane, butane and pentane; an alicyclic hydrocarbon such as cyclobutane, cyclopentane and cyclohexane; a halogenated hydrocarbon such as chlorodifluoromethane, difluoromethane, trifluoromethane, trichlorofluoromethane, dichloromethane, dichlorofluoromethane, dichlorodifluoromethane, trichlorofluoromethane, chloromethane, chloroethane, dichlorotrifluoroethane, dichlorofluoroethane, chlorodifluoroethane, dichloropentafluoroethane, pentafluoroethane, trifluoroethane, dichlorotetrafluoroethane, trichlorotrifluoroethane, tetrachlorodifluoroethane, chloropentafluoroethane and perfluorocyclobutane; an inorganic gas such as carbon dioxide, nitrogen and air; water and the like. Two or more of these foaming agents may be employed in combination. The amount of such volatile foaming agent is preferably 0.1 to 100 parts by mass per 100 parts by mass of a thermoplastic elastomer composition, although it can be selected appropriately depending on the types of the foaming agent and the intended expansion ratio.

A hollow particle foaming agent is a heat expandable thermoplastic resin microparticle which encapsulates a expanding agent as a core and whose shell component is a thermoplastic resin. The expanding agent employed in such hollow particle foaming agent may for example be one employed in a volatile foaming agent described above. The amount of the expanding agent in a heat expandable microparticle is preferably 5 to 30 parts by mass. On the other hand, a thermoplastic resin may for example be homopolymer or copolymer comprises (meth)acrylonitrile, (meth)acrylate, vinyl halide, vinylidene halide, styrenic monomer, vinyl acetate, butadiene, chloroprene and vinylpyridine and the like. Such thermoplastic resin may be crosslinked or capable of being crosslinked using a crosslinking agent such as divinylbenzene, ethylene glycol (meth)acrylate, triethylene glycol di(meth)acrylate, trimethylol propane tri(meth)acrylate, 1,3-butylene glycol di(meth)acrylate, allyl (meth)acrylate, triacryl formal, triallyl isocyanurate and the like. The mass mean particle size of such hollow particle foaming agent (in the state of a non-expanded microparticle) is usually 1 to 100 μm.

When using such foaming agent (heat degradable foaming agent, volatile foaming agent and hollow particle foaming agent), the size of the cell formed can be adjusted by employing a cell nucleating agent such as sodium bicarbonate, citric acid or talc if necessary. Such cell nucleating agent is preferably present usually in an amount of 0.01 to 1 parts by mass per 100 parts by mass of a thermoplastic elastomer composition.

The method for adding a foaming agent and the method for molding a foam are not particularly limited. For example, <1> a thermoplastic elastomer composition is kneaded with a foaming agent in a kneading extruder and then extruded. Alternatively, <2> a thermoplastic elastomer composition is incorporated with a foaming agent by a dry blending method and extruded via a kneading extruder. Alternatively, <3> a foaming agent is pressurized into a molten thermoplastic elastomer composition in a kneading extruder, which is then extruded. Alternatively, <4> a thermoplastic elastomer composition is kneaded with a foaming agent in a kneading extruder and then subjected to an injection molding. Alternatively, <5> a thermoplastic elastomer composition is admixed with a foaming agent and then subjected to an injection molding. Alternatively, <6> a thermoplastic elastomer composition is kneaded with a foaming agent in a kneading extruder and then transferred into a press mold, where a heating press molding is effected. Further alternatively, <7> a thermoplastic elastomer composition is kneaded with a foaming agent in a batch type kneader, calendered and then heated.

BEST MODE FOR CARRYING OUT THE INVENTION

Figure 1:
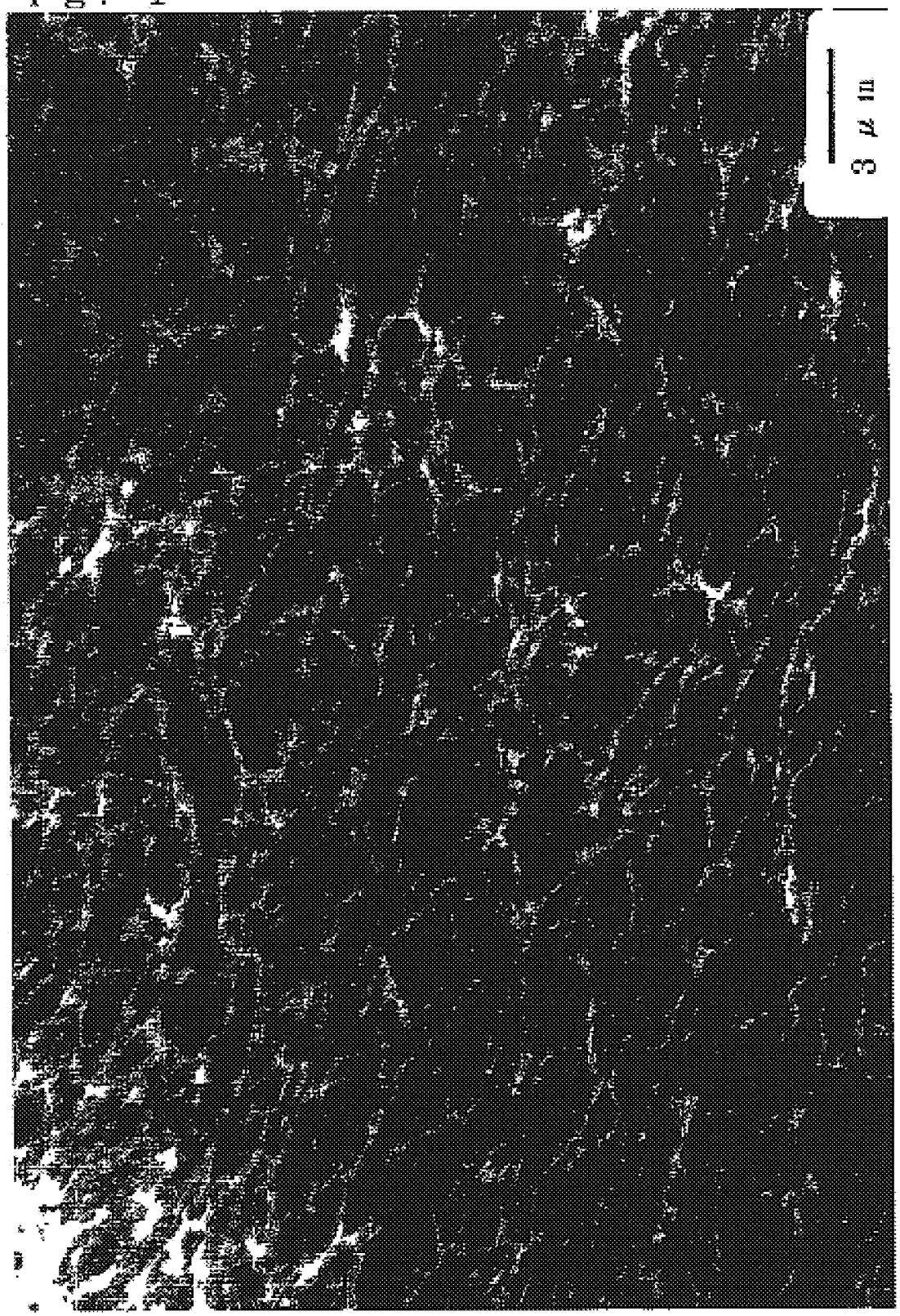
FIG. 1 shows a sectional view of an injection molded article of the thermoplastic elastomer composition of Example 1 when photographed as being magnified by 2000 times.

The present invention is further described in the following Examples and Comparatives, which are not intended to restrict the invention.

[1] Preparation of thermoplastic elastomer composition

The starting materials shown in Table 1 were mixed in the ratio shown in Table 1 and kneaded in a 10-L pressurizing kneader (MORIYAMA Manufacturing Co., Ltd. ) at the temperature set at 150° C. for the kneading time period of 15 minutes at the initial rotation speed of 32 rpm and the terminal rotation speed of 28 rpm. A molten composition thus obtained was pelletized using a feederruder (MORIYAMA Manufacturing Co., Ltd.) to obtain an intended thermoplastic elastomer composition. Subsequently, the thermoplastic elastomer composition obtained was subjected to an injection molder (TOSHIBA Machine Co., Ltd. model IS-90B) and molded into a sheet 2 mm in thickness, 120 mm in length and 120 mm in width. In Comparative 7, the starting materials shown in Table 1 except for an organic peroxide and a crosslinking aid were kneaded as described above and pelletized. Subsequently, the pellet thus obtained was incorporated with the organic peroxide and the crosslinking aid and mixed using a Henschel mixer for 30 seconds. Subsequently, a twin-screw extruder (IKEGAI Co., Ltd. Model PCM-45, One-way completely-engaged screw, with the ratio of screw flight length L and the screw diameter D (L/D) being 33.5) was used to extrude with a dynamic heat treatment at 230° C. for the residence time of 2 minutes, whereby obtaining a pelletized thermoplastic elastomer composition. Then the sheet was molded as described above.

Each starting material shown in Table 1 is as described below.

① EAO-based Copolymer (1)

Ethylene-propylene-5-ethylidene norbornene copolymeric rubber (JSR Corporation, trade name "EP98A", Ethylene content:79% by mole, Propylene content:21% by mole, Iodine value:15, Paraffin-based oil 75 phr oil-extended).

② Crystalline Polyethylenic Resin (2)

Linear low density polyethylene (LLDPE) (NIHON POLYCHEM, Co., Ltd. trade name "UF423").

③ Block Copolymer (3)

Hydrogenated diene-based copolymer (JSR Corporation, trade name "DYNARON DR 6200P").

④ BC5CW

As crystalline α-olefinic copolymer, propylene-ethylene block polymer (NIHON POLYCHEM, Co., Ltd. trade name "BC5CW").

⑤ Anti-aging Agent

Pentaerythrityl-tetrakis[3-(3,5-di-t-butyl-4-hydroxyphenyl) propionate)] (Ciba Specialty Chemicals Co., Ltd. trade name "IRGANOX 1010").

⑥ Softening Agent

Mineral oil-based softening agent (paraffin-based) (IDEMITSU KOSAN Co., Ltd. trade name "PW380").

⑦ Organic Peroxide 2,5-Dimethyl-2,5-di(t-butylperoxy)hexane (NOF Corporation, trade name "PERHEXA 25 B").

⑦ Crosslinking Aid

Divinylbenzene, Purity: 55% (SANKYO KASEI Co., Ltd.)

[2] Evaluation of Thermoplastic Elastomer Composition as Sheet a) Verification of Three-dimensional Network Structure A sheet of the thermoplastic elastomer composition obtained was cut into sections in the direction of the thickness using a microtome, stained with $RuO_4$ and the like, photographed by a transmission electron microscope as being magnified by 2000 times, and ensured for the presence of the three-dimensional network structure based on this photograph.

TABLE 1

| | | | Example | | | | | Comparative | | | | | |
|---|---|---|---|---|---|---|---|---|---|---|---|---|---|
| | Composition No. | | 1 | 2 | 3 | 4 | 5 | 1 | 2 | 3 | 4 | 5 | 6 | 7 |
| Thermoplastic elastomer composition | Composition | EAO-based copolymer (1) | 68 | 68 | 58 | 50 | 68 | 70 | 70 | 50 | 58 | 85 | 80 | 80 |
| | | Crystalline Polyethylenic resin (2) | 10 | 15 | 10 | 30 | 12 | — | 30 | — | — | 10 | — | — |
| | | Block copolymer (3) | 17 | 17 | 17 | 20 | 17 | — | — | 20 | 17 | — | 20 | — |
| | | Others BC5CW | 5 | — | 5 | — | 3 | 30 | — | 30 | 15 | 5 | — | 20 |
| | | Anti-aging agent | | | 0.2 | | | | | | 0.2 | | | |
| | | Softener | — | | 10 | — | | — | | | 10 | | — | |
| | | Organic peroxide | | | — | | | | | | — | | | 0.4 |
| | | Crosslinking aid | | | — | | | | | | — | | | 1.2 |
| | Physical characteristics | MFR (g/10 min) | 7 | 5.2 | 14 | 3.2 | 4 | 50 | 2.5 | 3.5 | 44 | 23 | 45 | 20 |
| | | JIS-A hardness | 62 | 56 | 59 | 73 | 58 | 85 | 72 | 84 | 58 | 55 | 47 | 71 |
| | | 100% Modulus (MPa) | 2 | 1.6 | 1.4 | 2.2 | 1.8 | 3.2 | 2 | 3.6 | 1.5 | 1.4 | 1 | 2.6 |
| | | 300% Modulus (MPa) | 3.1 | 2.4 | 2.2 | 12.9 | 2.7 | 4.5 | 2.8 | 5 | 2.1 | 2.3 | 1.5 | 4.5 |
| | | Strength at break (MPa) | 5.7 | 5.3 | 6 | 16 | 5.5 | 6.6 | 11 | 11 | 5 | 7 | 11 | 8.3 |
| | | Elongation at break (%) | 930 | 900 | 1000 | 890 | 920 | 770 | 950 | 800 | 980 | 870 | 940 | 640 |
| | | Compression set (%) | 41 | 33 | 37 | 38 | 35 | 86 | 50 | 62 | 65 | 67 | 66 | 37 |
| | | Presence or absence of three-dimensional network structure | | | Present | | | | | | Absent | | | | b) Evaluation of Mechanical Strength and Fluidity

A sheet of the thermoplastic elastomer composition obtained was punched out with a dumb-bell cutter into a certain shape, which was used as a test piece for determining JIS-A hardness, strength at break and elongation at break. The compression set was determined using a stack of 6 test pieces, each being punched out with the diameter of 28.7 mm. The fluidity was determined as a melt flow rate (hereinafter abbreviated as MFR). The results are shown in Table 1.

Each parameter was determined as follows.
JIS-A hardness: According to JIS K 6301.
Strength at break: According to JIS K 6301.
Elongation at break: According to JIS K 6301.
Compression set: According to JIS K 6301.
Fluidity: MFR, at 230° C. under load of 10 kg.

Based on the results shown in Table 1, any of Examples 1 to 5 which are the articles according to the invention exhibited a lower compression set when compared with Comparatives 1 to 6, thus providing a composition having an excellent elasticity recovery. When comparing Examples 1, 2 and 5, a reduced amount of the crystalline α-olefinic copolymer (BC5CW) gave a composition having a lower compression set, thus a more excellent elasticity recovery. Any of Examples 1 to 5 in Table 1 was proven to have the three-dimensional network structure shown in FIG. 1 on the basis of the electron microscope photograph. In addition, Method B A master batch was obtained similarly to Method A, and charged into an injection molder (TOSHIBA Machine Co., Ltd. Model IS-90B, Plate mold 100 mm in length, 100 mm in width and 3.5 to 6.5 mm in height, foaming temperature:220° C.) and subjected to an injection foaming to obtain a foam.

Method C

100 Parts by mass of a thermoplastic elastomer composition was supplemented with a foaming agent using an electrically heated roller (KANSAI ROLL Co., Ltd.) set at 160° C. to mold a thermoplastic elastomer composition containing the foaming agent into a sheet. This sheet was placed in a 10-cm square mold 0.5 cm in thickness, and pressurized with heating at 220° C. using an electrically heated press molding machine to effect a mold foaming, whereby obtaining a foam.

TABLE 2

| | | Example | | | | | | | | Comparative |
|---|---|---|---|---|---|---|---|---|---|---|
| Foam | | 6 | 7 | 8 | 9 | 10 | 11 | 12 | 13 | 8 |
| Thermoplastic elastomer composition | Composition No. in Table 1 | 1 | 1 | 2 | 3 | 4 | 1 | 1 | 1 | 7 |
| | Amount ratio | | | | 100 | | | | | 100 |
| Foaming agent | AC#3 | 0.5 | | | | | | — | | — |
| | EE206 | — | 2 | 2 | 2 | 2 | | — | | 2 |
| | 092 | | | | — | | | | 3 | |
| Foaming method | | | | A | | | B | C | A | A |
| Expansion ratio | | 1.7 | 1.7 | 1.8 | 1.6 | 2.0 | 1.6 | 1.8 | 2.0 | 1.1 |
| Foam surface | | | | | Smooth | | | | | Roughness |
| Foamed cell condition | | | | | Uniform | | | | | Not uniform |

Figure 2:
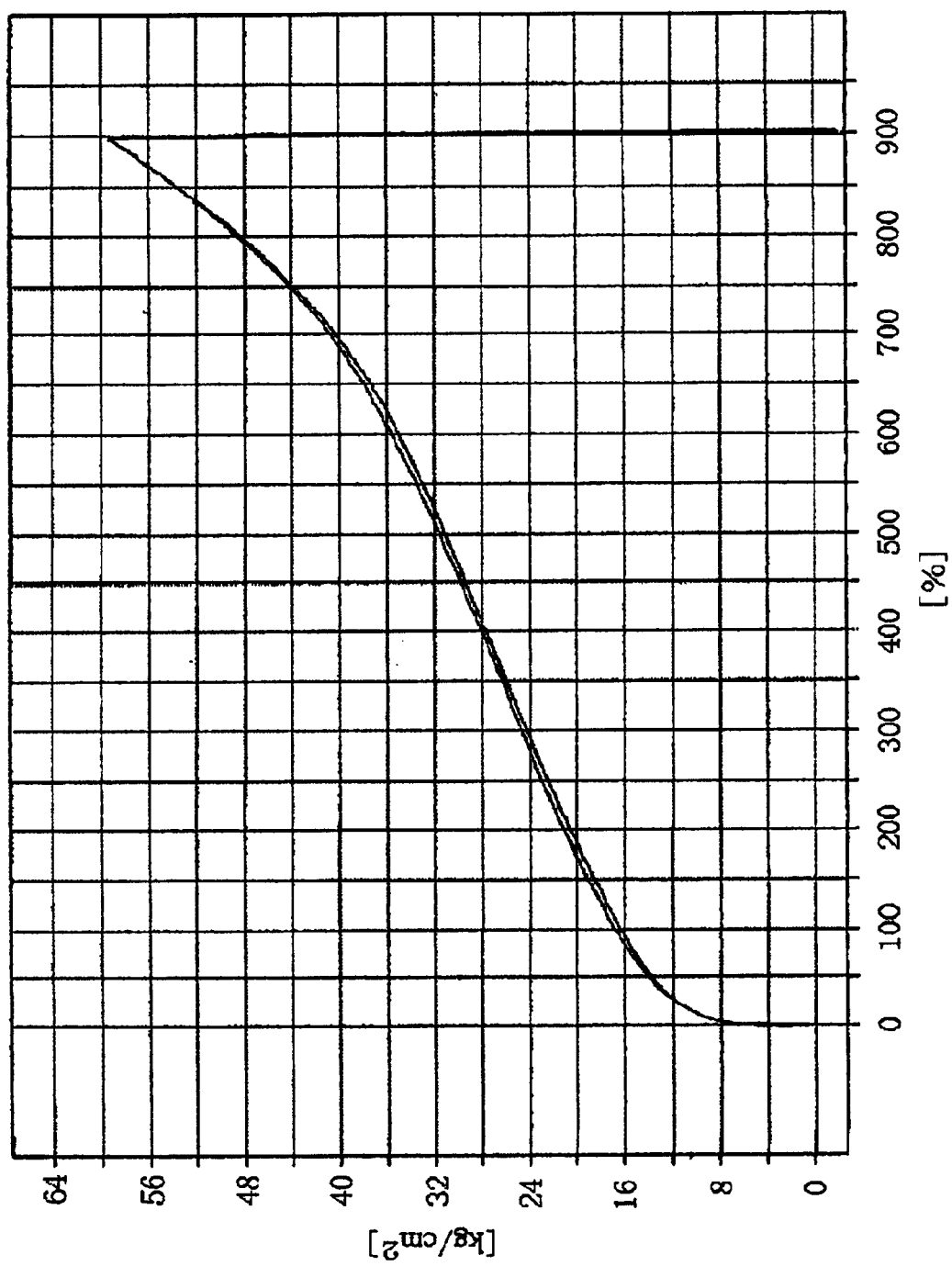
FIG. 2 shows a stress-strain diagram of the thermoplastic elastomer composition of Example 1.

FIG. 2 revealed that the stress-strain diagram of the thermoplastic elastomer composition of Example 1 did had a S-shaped curve. This S-shaped curve was also found in Examples 2 to 5. Comparative 7 is a composition having a chemical crosslinking.

[3] Production of Foam

To each thermoplastic elastomer composition obtained in Section [1], a foaming agent shown in Table 2 was added in an amount indicated in Table 2, and allowed to expand to obtain a foam by a foaming method shown in Table 2.

The foaming agents shown in Table 2 are detailed below.
AC#3: Heat degradable foaming agent (Eiwa Chemical Ind. Co., Ltd. trade name "VINYFOR AC#3", thermal decomposition point:208° C.)
EE206: Heat degradable foaming agent (Eiwa Chemical Ind. Co., Ltd. trade name "POLYTHLENE EE206", thermal decomposition point:200° C.)
092: Hollow particle foaming agent (EXPANCEL, trade name "EXPANCEL-092 (DU)-120", maximum heat expansion temperature: 180° C.)

Each method shown in Table 2 is detailed below.

Method A

100 Parts by mass of a thermoplastic elastomer composition was combined with 1 parts by mass of a wetting agent together with a foaming agent and mixed to obtain a master batch. This master batch was charged into a single-screw extruder 40 mm in diameter (TANABE PLASTIC KIKAI Co., Ltd. L/D=28, T die 20 mm in width and 1.5 mm in height, foaming temperature:220° C., rotation speed:20 rpm, Full flight screw) and subjected to an extrusion foaming to obtain a foam.

[4] Evaluation of Foam

Each foam obtained in Section [3] was examined for its expansion ratio, foamed cell condition and surface condition. The results are included in Table 2. The expansion ratio was calculated as "expansion ratio=pre-expansion specific gravity/post-expansion specific gravity" after determining the specific gravity before and after the expansion. The foamed cell was photographed by a transmission electron microscope as being magnified by 100 times, and evaluated visually based on this photograph. The surface condition of a foam was also evaluated visually. The electron microscope photograph of Example 1 is shown in FIG. 3.

Figure 3:
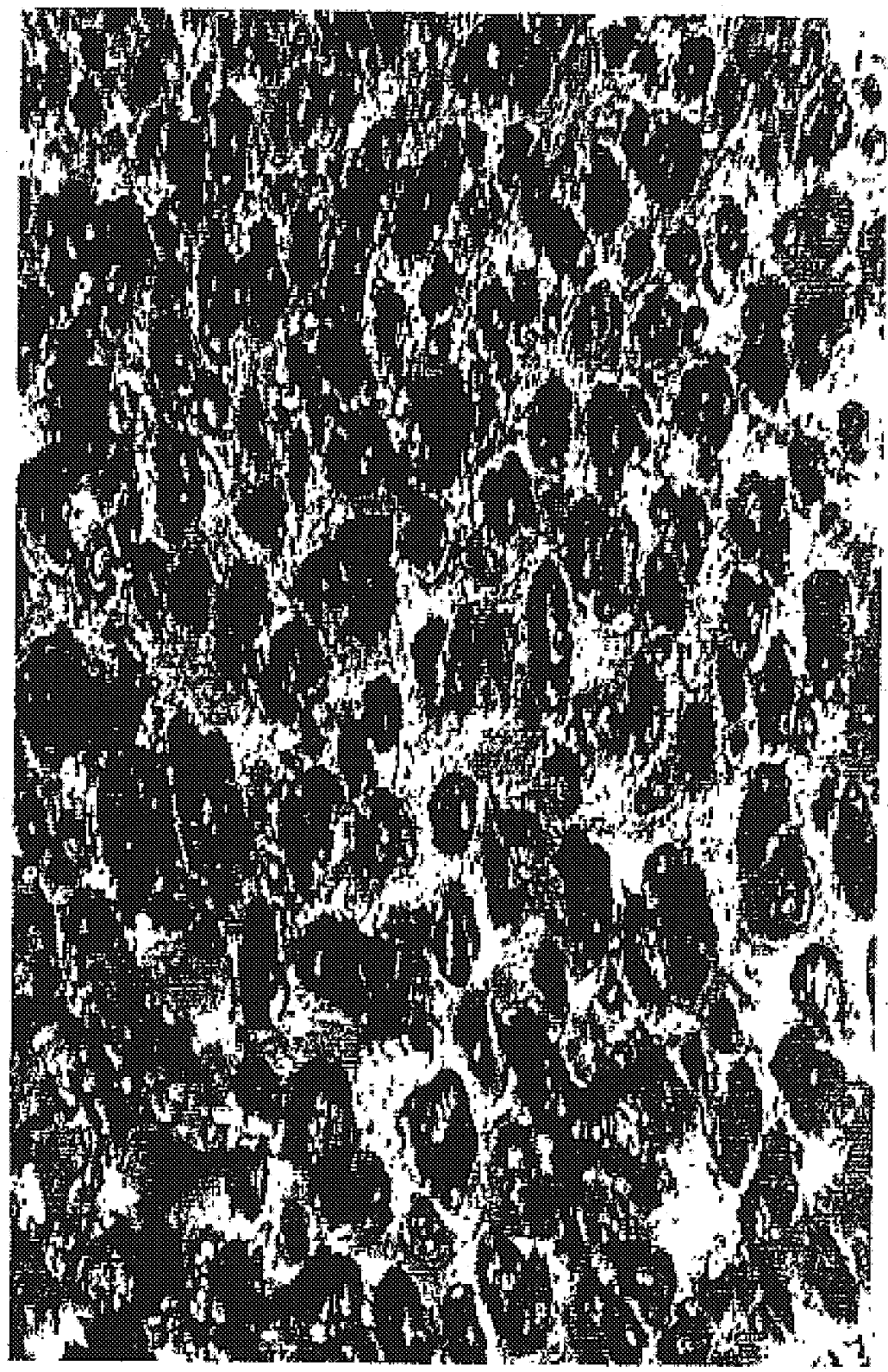
FIG. 3 shows a sectional view of the foam of Example 1 when photographed as being magnified by 100 times.

Based on the electron microscope photograph shown in FIG. 3, the foam of the invention had a cell whose size and shape are uniform. It was also noted that the foaming was effected uniformly throughout the entire foam. The foaming at a high expansion ratio was also proven. The results shown in Table 2 indicated an excellent surface appearance. On the contrary, the foam of Comparative 8, which was produced from the composition of Comparative 7, exhibited a low expansion ratio and its foamed cell was uneven and its surface appearance was poor (rough).

Industrial Applicability

According to the invention, a thermoplastic elastomer composition having an excellent elasticity recovery due to a three-dimensional network structure which is not formed by a chemical crosslinking and exhibiting an excellent processability upon melting due to the withdrawal of this three-dimensional network structure can be obtained. Also according to the invention, a foam having a highly closed cell, an uniform cell shape and size, an excellent elasticity recovery, flexibility and appearance can be obtained. Also according to a method for producing a foam of the invention, a foam described above can stably be obtained.

What is claimed is:

1. A foam whose main component is a thermoplastic elastomer composition comprising as main components an ethylene-α-olefinic copolymer (1) a crystalline polyethylenic resin (2) and a block copolymer (3), wherein said crystalline polyethylenic resin (2) and said block copolymer (3) are in a three-dimensional network structure in a matrix comprising said ethylene-α-olefinic copolymer (1), wherein said block copolymer (3) comprises a crystalline polymeric block, wherein said foam in non-chemically crosslinked and is in a three-dimensional network structure.

2. A foam according to claim 1, wherein said block copolymer (3) is a polymer obtained by hydrogenating a block copolymer having a block A at both ends and block B between said block As, wherein said block A is a butadiene polymeric block and said block B is a conjugated diene polymeric block and/or a vinyl aromatic compound-conjugated diene random copolymeric block, wherein said block A is present in an amount of 5 to 90% by mass and said block B is present in an amount of 10 to 95% by mass based on 100% by mass as the total of said A and said B, and wherein the 1,2-vinyl group content in said block A is less than 25% by mole and the 1,2-vinyl group content in said block B is not less than 25% by mole, wherein at least 80% of all double bonds contained in said block copolymer (3) before the hydrogenation is saturated and, wherein the number average molecular weight of said block copolymer (3) is 50,000 to 700,000.

3. A foam according to claim 1, wherein the thermoplastic elastomer composition is non-chemically crosslinked.

4. A foam according to claim 1 comprising said ethylene-α-olefinic copolymer (1) in an amount of 10 to 94% by mass, said crystalline polyethylenic resen (2) in an amount of 5 to 80% by mass and a block copolymer (3) in an amount of 1 to 80% by mass based on 100% by mass as the total of said thylene-α-olefinic copolymer (1), said crystalline polyethylenic resin (2) and said block copolymer (3).

5. A foam according to claim 1 comprising a mineral oil-based softening agent in an amount of 200 parts by mass or less based on 100 parts by mass as the total of said ethylene-α-olefinic copolymer (1), said crystalline polyethylenic resin (2) and said block copolymer (3).

6. A foam according to claim 1, wherein said foam has a highly closed cell

7. A method for producing a foam comprising incorporating 0.01 to 20 parts by mass of a foaming agent to 100 parts by mass of a thermoplatic elastomer composition comprising as main components an ehtylene-α-olefinic copolymer (1), a crystalline polyethylenic resin (2) and a block copolymer (3), wherein said crystalline polyethylenic resin (2) and said block copolymer (3) are in a three-dimensional network structure in a matrix comprising said ethylene-α-olefinic copolymer (1) followed by foaming, wherein said block copolymer (3) comprises a crystalline polymeric block.

8. A method for producing a foam according to claim 7, wherein said block copolymer (3) is a polymer obtained by hydrogenating a block copolymer having block A at both ends and block B between said block As, wherein said block A is a butadiene polymeric block and said block B is a conjugated diene polymeric block and/or vinyl aromatic compound-conjugated diene random polymeric block, wherein said block A is present in an amount of 5 to 90% by mass and said block B is present in an amount of 10 to 95% by mass based on 100% by mass as the total of said A and said B, and wherein the 1,2- vinyl group content in said block A is less than 25% by mole and the 1,2- vinyl group content in said block B is not less than 25% by mole.

wherein at least 80% of all double bonds contained in said block copolymer (3) before the hydrogenation is saturated, and wherein the number average molecular weight of said block copolymer (3) is 50,000 to 700,000.

9. A method according to claim 7, wherein the thermoplastic elastomer composition is non-chemically crosslinked.

10. A method according to claim 7, wherein said thermoplatic elastomer composition comprises said ethylene-α-olefinic copolymer (1) in an amount of 10 to 94% by mass, said crystalline polyethylenic resin (2) in an amount of 5 to 80% by mass and a block copolymer (3) in an amount of 1 to 80% by mass based on 100% by mass as the total of said ethylene-α-olefinic copolymer (1), said crystalline polyethylenic resin (2) and said block copolymer (3).

11. A method according to claim 7, wherein said thermoplastic elastomer composition comprises a mineral oil-based softening agent in an amount of 200 parts by mass or less based on 100 parts by mass as the total of said ethylene-α-olefinic copolymer (1), said crystalline polyethylenic resin (2) and said block copolymer (3).

12. A method according to claim 7, wherein said foaming agent is at least one selected from the group consisting of a heat degradable foaming agent, a volatile foaming agent and a hollow particle foaming agent.

13. A method according to claim 12, wherein the foaming agent is at least a heat degradable foaming agent, which is at least one selected from the group consisting of nitroso-based foaming agent, an azo-based foaming agent, a sulfohydrazide-based foaming agent, a triazine-based foaming agent, a tetrazole-based foaming agent and an inorganic foaming agent.

* * * * *